Feb. 12, 1929. McKINLEY STOCKTON Re. 17,212
PROCESS OF AND APPARATUS FOR TREATING MINERALS
2 Sheets-Sheet 1
Original Filed July 20, 1925
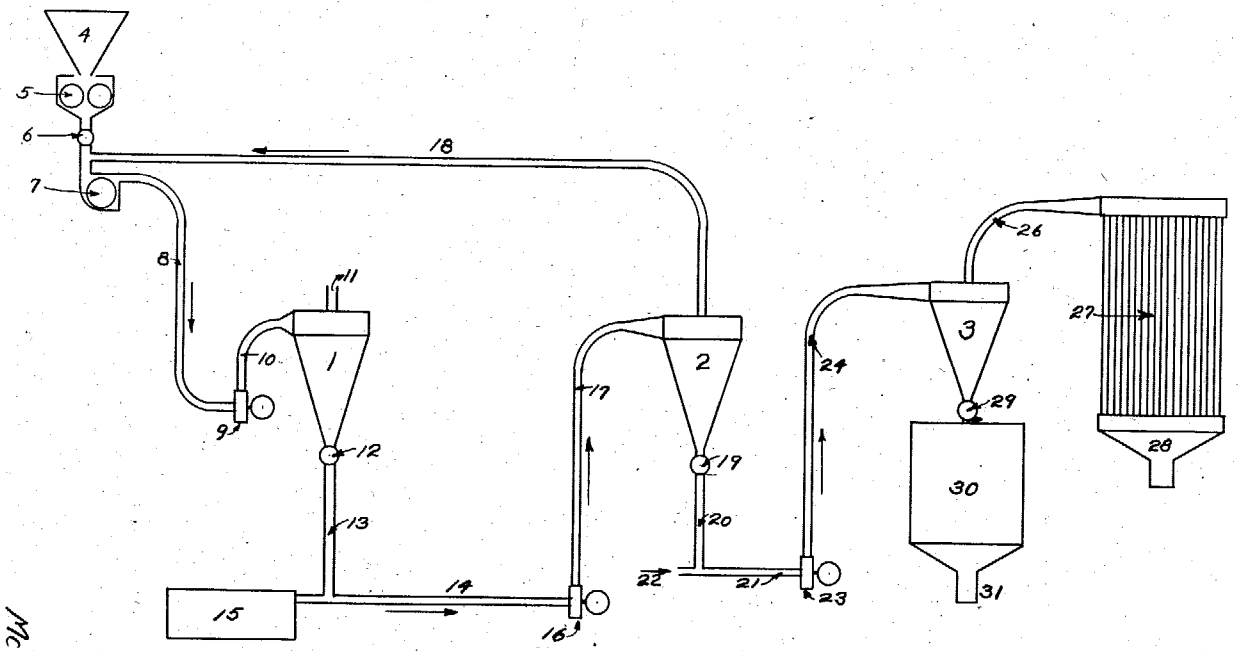
— FIG. 1 —
McKINLEY STOCKTON
INVENTOR.
BY C. A. Mikelsky
ATTORNEY.

Feb. 12, 1929. McKINLEY STOCKTON Re. 17,212
PROCESS OF AND APPARATUS FOR TREATING MINERALS
2 Sheets-Sheet 2
Original Filed July 20, 1925
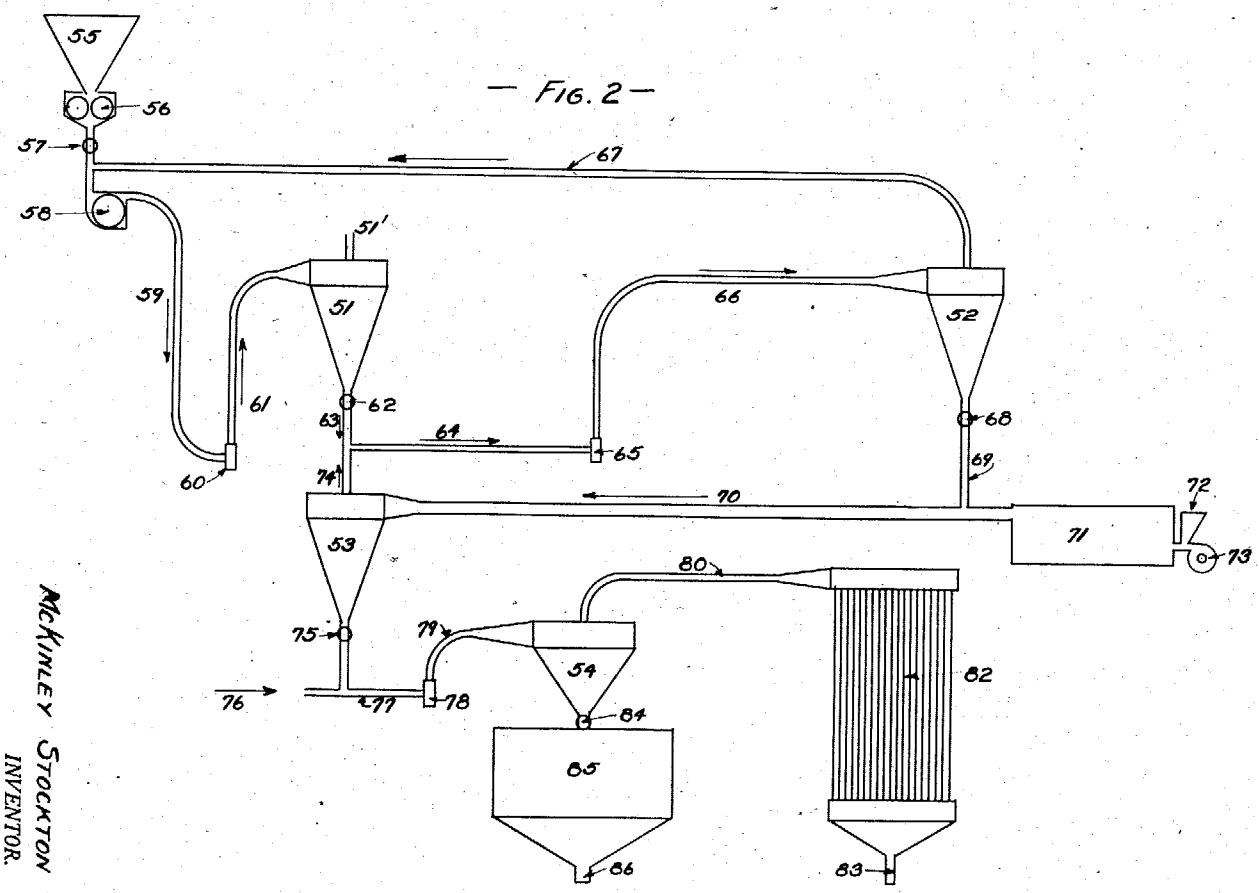
— FIG. 2 —
McKINLEY STOCKTON
INVENTOR.
BY C. A. Mitchell
ATTORNEY.

Reissued Feb. 12, 1929. Re. 17,212

UNITED STATES PATENT OFFICE.

McKINLEY STOCKTON, OF LOMPOC, CALIFORNIA, ASSIGNOR TO THE CELITE COMPANY, OF LOS ANGELES, CALIFORNIA, A CORPORATION OF CALIFORNIA.

PROCESS OF AND APPARATUS FOR TREATING MINERALS.

Original No. 1,611,791, dated December 21, 1926, Serial No. 44,896, filed July 20, 1925. Application for reissue filed December 12, 1928. Serial No. 325,611.

This invention pertains to the art of milling, disintegrating or crushing of mineral bodies to a state of fine division, a classification or separation of such milled mineral without the loss of the finest constituents, and also provides for the drying dehydration and calcination, or both, of such minerals.

The principal object of this invention is to provide a method of milling a mineral, drying or calcining such milled mineral, and then separating the milled product into desired grades of fineness without the loss of the exceedingly fine particles produced by the milling operation. This method or process of operation may be effected in relatively simple, inexpensive apparatus, also disclosed and claimed by me.

Many minerals and clays which it is desired to dry and mill, such as, for example, diatomaceous earth, kieselguhr or infusorial earth, or such earths combined with clay, contain high amounts of absorbed or combined water or both forms of moisture. In the case of diatomaceous earth, the raw or crude mineral contains as much as 65% absorbed moisture. It has been found that most porous minerals in lump form, or minerals originally found with a high moisture content, resist a drying operation, after a portion of the water has been removed, because of the fact that the outer surfaces of the material insulate the inner portions, and thereby prevent the rapid penetration of drying heat. It is, therefore, seen that if the drying operation is performed on minerals in a finely divided form, the drying heat may be applied to much greater benefit. The most effective drying operation, therefore, is that in which the mineral material is first ground to a suitable state of division and then exposed to or suspended in a heated medium or gas so that each individual particle is surrounded by the heating or drying medium. The latter mode of operation has been used on certain particular products by blowing the powdered or granular product into a receptacle or chamber, a heated gas being generally used. There has been difficulty experienced, however, in the subsequent separation of the powdered material from the gas. The dust problems arising from this method necessitating the use of electrical dust collectors, spraying systems and the like.

It is acknowledged that certain units of equipment similar to those comprising the apparatus herein disclosed have been disclosed by the prior art, for example, conical air separating chambers have been used for such purpose, but to the best of my knowledge, such units have never been connected, as shown by me, nor was it possible to heat, dry, separate, and mill or disintegrate a mineral in a closed circuit, and eliminate the loss of finely disintegrated constitutents.

The present invention discloses a process of drying mineral materials and the like in a finely divided form (containing moisture) while suspended in a current of heated gas or other fluid and then separating the dried material from said gas in suitable air or gas separating apparatus, the dust being recovered by bringing it in contact with the moist or wet material just entering the process on which the dust is absorbed and retained. In this manner a dust loss is not created and the use of expensive or elaborate dust collecting machinery is obviated, the form of apparatus which has been found to be adapted to the process being comparatively simple and inexpensive. My process is particularly adapted to the milling, drying, and separating operations encountered in the treatment of diatomaceous earth, kieselguhr or infusorial earth, or the like. It has been used with entire success in the production of powdered grades of diatomaceous earth of such fineness that only 1–5% is left on a 150-mesh screen, while about 20–40% of the material is less than 0.001 mm. in size. Inasmuch as the dried, powdered diatomaceous earth in this state of division weighs but 8 to 10 lbs. per cu. ft. great difficulty had hitherto been encountered in separating the dust of such product, from the gas or other fluid used in conveying or separating apparatus.

The accompanying drawings give a diagrammatic illustration of my process and one modification thereof and at the same time disclose an apparatus which may be used in its operation. Fig. 1 shows a process in which a mineral material is disintegrated, dried, and separated into various grades of fineness. Fig. 2 shows a modification of the process in which a mineral material is disintegrated, dried, calcined and separated into various grades of fineness.

In Fig. 1 the raw or crude mineral (containing moisture) is fed from a suitable bin 4 to a preliminary milling machine 5 which in this case may be spiked rolls. The partly crushed mineral may then be fed through a tourniquet, scroll, or other feeding device 6 into an enclosed milling or disintegrating apparatus 7 of any appropriate design, for example, a swing hammer mill, from which the milled material is discharged by suitable means such as pipe means 8 into a fan, blower, or disintegrator 9 adapted to the conditions. This blower or disintegrator discharges the milled material through pipe means 10 into an air separator or cyclone 1 which is equipped with an outlet means 2 through which all excess air or gas or other fluid may be discharged. The base of the cyclone or separator 1 into which the milled mineral settles, may be provided with a tourniquet, scroll, or other feeding device 12 which discharges from means 13 into suitable pipe or cylindrical means 14 which constitutes a drying chamber, of requisite length and which may be made of cast iron, refractory tile, etc. A furnace, heater, or other suitable source of heated air, gas, or other fluid, for example, waste heat from another operation (provided such gas is at a temperature above 212° F.), indicated at 15 discharges into means 14 and the moist, milled material from cyclone 1 is thereby surrounded or suspended in means 14 with a heated gas or drying medium. This mixture of milled material and gas is discharged into a blower or disintegrator 16 which in turn discharges through means 17 into a second cyclone air separator or other suitable device 2 wherein the suspended matter is separated from its gaseous carrier by a gravity gas-separation operation. The discharge pipe 18 from this second cyclone leads back to the milling or disintegrating apparatus 7 and thereby forms a closed circuit.

The above process and apparatus pertain directly to my invention and the dried and milled mineral may then be discharged through suitable feeding device 19 from the bottom of cyclone 2 but inasmuch as it has been heated during the drying operation in its passage through means 14, blower 16, and means 17, it may be desirable to cool said material before bagging or otherwise preparing the material for shipment. The milled and dried mineral may be, therefore, discharged from the base of cyclone 2 through suitable feeding mechanism such as a tourniquet 19 into means 20 leading into pipe means 21, provided with an inlet for cold air as indicated at 22. The finely divided and dried mineral matter is then sucked into a fan or impeller 23 of suitable design, and discharged through means 24 into cyclone 3, from which the coarser material is discharged through a valve, or scroll, or tourniquet, etc. 29, into a suitable container or bin 30 from which it may be removed through means 31 and sacked, bagged, or otherwise prepared for shipment. Air containing exceedingly fine particles or dust, may be discharged through means 26 into a suitable dust collecting system indicated at 27 such as, for example, a stocking dust collector made of tubular fabric open-end containers, through which the air is blown, the dust being left on the interior of said tubular membranes. Eventually the dust falls to the base 28 of said stocking dust collector and may be withdrawn therefrom periodically and also bagged or otherwise prepared for shipment as a distinct and exceedingly fine grade of material.

The temperatures of the gases discharged into the atmosphere from the separating chamber 1 must not be too high, else a certain amount of very finely disintegrated material is lost through this outlet. The temperature of the exhaust gases at which the most effective operation takes place varies with the percentage of moisture in the crude or raw material being treated, the temperature to which the material is heated, the percentage of moisture in the material entering that separating chamber which exhausts into the atmosphere, and the velocity of the gases. For example, in the manufacture of disintegrated or finely divided diatomaceous earth from natural diatomaceous earth, which originally contained 40% free moisture, it was found that if the disintegrated material entering the air separating chamber 1 contained less than about 20% moisture, the exhaust gases 11 would show a loss of dust, while when the moisture content was greater, say 25%, there was no dust loss. This was true under identical conditions; that is, the degree of milling and velocity of gases was kept constant. Temperature of the gases going through blower 16 were approximately 500° F. while the gases being returned to the primary disintegrator 7 were about 225° so that some drying action also took place in means 8, 9, and 10, since the finely divided moist material is held in suspension for a substantial period of time in these means. Supplies of heated gas may be introduced at disintegrator 7 or to pipe means 8, in addition to the gases introduced by heater or other source 15, whenever the material being fed into the system at 4 contains very large quantities of moisture.

Referring to Fig. 1, it is seen that the gas discharged thru the exhaust 18 from chamber 2 contains dust which is absorbed or retained by the moist material disintegrated in the mill 7 and that there is no dust loss from exhaust 11 from chamber 1, by reason of the moisture present in the material at this stage, also, as above noted, this gas is heated and this heat is utilized for drying the moist material in the mill.

Fig. 2 refers to a modification of my process in which the temperatures to which the materials are heated are relatively high, for example, temperatures about 1400° F. or 1800° F. or higher may be reached in the calcining zone. This modification also embraces a step in which the heated gases from the calcining zone are passed through the previous zones and the heat contained in such heated gases is used in drying the mineral before it reaches the calcining zone. In this modification also dust loss is prevented in much the same manner as described in Fig. 1. The calcination disclosed by the following modification may be made on the raw, disintegrated mineral either with or without the addition of suitable salts or chemicals; for example, it has been found that calcination of finely divided diatomaceous earth in the presence of salts of alkali metals produces a white, fluffy, and very desirable product.

In Fig. 2 the raw mineral is fed from a bin 55 or other suitable source of supply, to a suitable crushing machine 56, for example, spiked rolls. The partly disintegrated mineral is then fed by a suitable mechanism 57 (which may be a scroll or belt conveyor), to an enclosed disintegrating apparatus 58 which may be a swing hammer mill or the like. The disintegrated mineral is then passed by suitable pipe means 59 through a fan or impeller 60 (which may be so designed as to give a certain amount of disintegrating action), through pipe means 61 to a suitable air separating chamber 51. The exhaust 51′ from said air separating chamber discharges into the atmosphere while the disintegrated material discharges from the air separating chamber 51 through a tourniquet, scroll, or other suitable means 62 into and through pipe means 63 into pipe means 64, which lead to a fan or impeller 65. The last mentioned fan discharges through pipe means 66 into a secondary air separating chamber 52. The gas containing fine particles of matter is discharged from the air separating chamber 52 through pipe means 67 and lead back to the closed chamber containing the disintegrator 57.

The disintegrated material from air separating chamber 52 is discharged through a suitable feeding mechanism 68 which may be a tourniquet, scroll, or the like, into pipe means 69, which discharge directly into a suitable chamber 70 in which the material is subjected to a calcining temperature. The chamber 70 may be made of any suitable material capable of withstanding the temperatures employed. For example, it may be made of fire clay, tile, or brick, or it may be made of a heat resisting metal. Chamber 70 is connected directly with a source of heat 71 which may be an auxiliary furnace, having a mixing or combustion chamber, into which a draft of diluting air or air to support combustion is supplied by means of blower 73. One furnace used by me had preheating passages in the furnace walls with adjustable openings so as to give thorough control of air inlets and give complete combustion. A feeding mechanism 72 may discharge into said fan 73 to supply salts of alkali from metals, although such salts may also be introduced at any other point in the system, for example, at 68. In passing through chamber 70 the hot gases calcine or either heat the disintegrated material and discharge into a third air separating chamber 53, from which the hot gases are discharged through pipe means 74 into the above mentioned pipe means 64. The newly calcined, finely divided mineral contained in air separating chamber 53 is discharged through a feeding valve or mechanism 75 into pipe means which lead into pipe means 77, which in turn discharge into a fan or impeller 78 which discharges into a fourth air separating chamber 54 by means of pipe 79. Fan or impeller 78 may have a means of admitting cold air thereto as indicated at 76 so as to further cool the recently calcined material discharged from chamber 53. Chamber 54 discharges the finely divided calcined mineral through a feeding mechanism such as a tourniquet 84 into a storage bin or other suitable receptacle 85, from which such material may be withdrawn through means 86 for bagging or other disposition. The gases leaving the air separating chamber 54 through pipe means 80, such gases containing exceedingly minute particles of mineral matter, are led into a suitable dust collecting or air separating system, such as is indicated at 82, and which may be a stocking dust collector in which the minute particles are retained and collected in the bottom of said collector in bin 83.

It is to be remembered that Figs. 1 and 2 are merely diagrammatic representations of the fundamental ideas embodied in my invention and that the angle at which the various pipe means connect the units may be varied to a large degree, and the number or location of fans or impellers may be changed with the conditions encountered in practise. For example in Fig. 2, the calcining chamber 70 may be placed vertically and the calcined material discharged into a fireproof storage in which it is cooled before being passed through air separating chamber 53 or 54 or both. The addition of salts or alkali metals during or before the calcining operation is not necessarily followed in all cases, inasmuch as a purely calcining operation on finely divided mineral matter may be accomplished without such salts. Furthermore, the fans or impellers used in this invention may readily accomplish a certain amount of milling or disintegration, particularly when an easily reduced mineral, such as diatomaceous earth, is being treated. Whenever fans or impellers are therefore specified they may be understood to function not only as means of blowing but also as secondary disintegrators.

What is claimed is:

1. In a milling and drying process, the prevention of dust loss by disintegrating material containing moisture, passing such disintegrated material by pneumatic means into a separating apparatus, discharging the substantially dust-free air from such separating apparatus, discharging the disintegrated material from the separating apparatus into a heated gas, passing such gas and disintegrated material into a second separating apparatus and circulating the partly spent gas containing dust from the second separating apparatus to the moist disintegrated material.

2. In a combined milling and heating process, the prevention of dust loss by disintegrating material containing moisture, passing such disintegrated material by pneumatic means into a separating chamber, discharging the dust free gas from such chamber into the atmosphere, discharging the milled material from such chamber into a current of heated gas, conveying the milled material and gas to a second separating chamber and discharging the dust laden gas from such second chamber into the moisture-containing material so as to conserve such dust.

3. In a combined milling and heating process employing disintegrating apparatus, and primary and secondary air separating chambers, the circulation of partly spent heated gases containing dust from the secondary air separating chamber to the disintegrating apparatus so as to conserve such dust, and discharging dust free air from the primary air separating chamber.

4. In a combined milling and heating process, the prevention of dust loss by disintegrating diatomaceous earth containing moisture, passing such disintegrated diatomaceous earth by pneumatic means into a separating chamber, discharging the dust free gas from such chamber into the atmosphere, discharging the milled diatomaceous earth from such chamber into a current of heated gas, conveying the milled diatomaceous earth and gas to a second separating chamber and discharging the dust laden gas from such second chamber into the disintegrated moist diatomaceous earth so as to conserve such dust.

5. An apparatus for disintegrating and drying minerals without loss of dust comprising a substantially enclosed disintegrator, pneumatic means of conducting disintegrated mineral to an air separating chamber, gas discharge means from said chamber and discharge means for disintegrated mineral from said chamber leading to a source of heated gas, means of conducting such heated gas and disintegrated mineral to a second separating chamber, and means for conducting the dust containing gases from such chamber into the disintegrator to conserve such dust.

6. An apparatus for disintegrating and drying diatomaceous earth containing moisture without loss of dust comprising a substantially enclosed disintegrator, pneumatic means of conducting moist disintegrated diatomaceous earth to an air separating chamber, gas discharge means from said chamber and discharge means for disintegrated diatomaceous earth from said chamber leading to a source of heated gas, means of conducting such heated gas and disintegrated diatomaceous earth to a second separating chamber, and means for conducting the dust containing gases from such chamber into the moist disintegrated material.

7. The herein described process of removing dust from dust laden air or gases produced in the milling and heating of moist siliceous material and the like; consisting in milling the siliceous material, heating the milled material, and returning the dry dust laden air or gases produced by such treatment into the moist material being treated previous to the drying thereof, whereby the dust is deposited on and retained by the wet or moist material.

8. The herein described process of milling and drying moist diatomaceous earth, consisting in first disintegrating the raw diatomaceous earth, discharging the disintegrated diatomaceous earth into a suitable heater; and returning the dust laden gases or air produced by such treatment into the moist diatomaceous earth being treated before the latter reaches the heater.

9. In a combined milling and heating process, the prevention of dust loss by disintegrating moisture-containing diatomaceous earth, passing such disintegrated diatomaceous earth by pneumatic means into a separating chamber, discharging substantially dust-free gas from such chamber into the atmosphere, discharging the milled diatomaceous earth from such chamber into a current of gas at a temperature above 300° F., conveying the milled diatomaceous earth and gas to a second separating chamber by pneumatic means, and discharging the dust containing gas from such second chamber into the initial disintegrator containing moisture-containing material so as to conserve such dust.

10. A continuous process for the combined milling, drying, and separating of moist mineral materials and the like which comprises milling the moist material to reduce it to a finely divided form, suspending the finely divided material in a heated gas whereby drying of the suspended particles is effected, subjecting the gas with the dried particles suspended therein to a gravity-separation operation to separate the dried particles from the gaseous carrier, passing the dust laden gas resulting from said separation operation into contact with moist material treated in the milling operation to retain the dust and utilize any available heat in the gas for partial drying of the moist material, continuously withdrawing moisture laden gas from the system, and replacing said withdrawn gas by gas heated to an elevated temperature and adapted for drying.

11. An apparatus for the combined milling, drying, and separating of moist mineral materials and the like, which comprises a disintegrator or mill for reducing the material to a finely divided form, a drying chamber for drying finely divided material from the mill while suspended in a heated gas, a gravity gas-separating device for separating the dried material from its gaseous carrier, and means for conducting dust laden gas produced in said separating device to the disintegrator thereby forming a closed circuit, and means for supplying heated gas to said circuit.

12. In a process for the combined milling, drying, and separating of moist mineral materials and the like comprising milling the moist material to reduce it to finely divided form, suspending the finely divided material in a heated gas whereby drying of the suspended particles is effected, and separating the dried material from its gaseous carrier by a gravity-separation operation, the improvement which consists in passing the dust laden gas resulting from the gravity-separation operation into contact with moist material treated in the milling operation, whereby the dust is absorbed and any available heat present in the gas utilized to effect partial drying of the moist material.

13. A process for disintegrating, drying, and separating moist mineral materials and the like which comprises, milling the material to reduce it to a finely divided form, suspending the finely divided material in a current of heated gas whereby drying of the suspended particles is effected, and subjecting the gas together with the dried particles suspended therein to a gravity separation operation whereby the dried particles are collected and separated from the gas.

14. A process for disintegrating, drying, and separating moist mineral materials and the like which comprises, milling the material to reduce it to a finely divided form, suspending the finely divided material in a current of heated gas whereby drying of the suspended particles is effected, and passing the gas together with the dried particles suspended therein thru a gas separator of the cyclone type whereby the dried particles are collected and separated from the gas.

15. A process for disintegrating, drying, and separating moist mineral materials and the like which comprises, milling the material to reduce it to a finely divided form, suspending the finely divided material in a current of heated gas whereby drying of the suspended particles is effected, subjecting the gas together with the dried particles suspended therein to a gravity-separation operation whereby the dried particles are collected and separated from the gas, and passing the dust laden gas thus separated into contact with moist material treated in the milling operation whereby the dust is absorbed on the moist material.

16. A process for disintegrating, drying, and separating moist mineral materials and the like which comprises milling the material to reduce it to a finely divided form, suspending the finely divided material in a current of heated gas whereby drying of the suspended particles is effected, subjecting the gas together with the dried particles suspended therein to a gravity-separation operation whereby the dried particles are collected and separated from the gas, and passing the dust laden gas thus separated and still retaining an elevated temperature into contact with moist material entering the process whereby the dust is absorbed on the moist material and partial drying of said material effected.

17. A process for the disintegration and drying of moist mineral material and the like, which comprises milling the moist material to reduce it to a finely divided form, forming a gaseous suspension of the finely divided particles by passing a current of heated gas thereover, maintaining the particles in suspension for a period whereby drying is affected, and subjecting the gas having the suspended particles therein to a gravity-separation operation whereby the gas and the suspended matter are substantially separated.

18. An apparatus for the disintegration and drying of moist mineral material and the like, which comprises a disintegrator or mill to reduce the material to a finely divided form, means for introducing a current of heated gas into the disintegrator to produce a suspension of the finely divided particles, a gravity gas-separator to separate the suspended matter from its gaseous carrier, and a conduit connecting said mill and gas-separator for conducting the gas having the suspended material therein from said mill to the gas-separator and for maintaining the suspension for a sufficient period of time to effect drying of the suspended matter.

19. An apparatus for the disintegration and drying of moist mineral material and the like, which comprises a disintegrator or mill to reduce the material to a finely divided form, means for introducing a current of heated gas into the disintegrator to produce a suspension of the finely divided particles, a gravity gas-separator to separate the suspended matter from its gaseous carrier, a conduit connecting said mill and gas-separator for conducting the gas having the suspended material therein from said mill to the gas-separator and for maintaining the suspension for a sufficient period of time to effect drying of the suspended matter, a discharge pipe, inter-connecting said separator and said means for introducing heated air, to conduct heated dust laden gas from the separator to said means.

20. An apparatus for disintegrating, drying, calcining, and separating moist mineral materials and the like which comprises, a disintegrator or mill for reducing the material to a finely divided form, a drying chamber for drying finely divided material from the mill while suspended in a heated gas, a gravity gas-separating device for separating the dried material from its gaseous carrier, a chamber having heating means associated therewith, for receiving and calcining the dried material from said separator, and means for introducing hot waste gases from said calcining chamber into the drying chamber.

21. An apparatus for disintegrating, drying, calcining, and separating moist mineral materials and the like which comprises, a disintegrator or mill for reducing the material to a finely divided form, a drying chamber for drying finely divided material from the mill while suspended in a heated gas, a gravity gas-separating device for separating the dried material from its gaseous carrier, a chamber for receiving dried material from said separator, means for passing a current of hot gas thru said chamber into contact with said dried material to produce calcination thereof, and means for introducing the hot waste gas discharged from said calcining chamber into the drying chamber.

22. An apparatus for disintegrating, drying, calcining, and separating moist mineral materials and the like which comprises, a disintegrator or mill for reducing the material to a finely divided form, a drying chamber for drying finely divided material from the mill while suspended in a heated gas, a gravity gas-separating device for separating the dried material from its gaseous carrier, a chamber for receiving dried material from said separator, means for passing a current of hot gas thru said chamber into contact with said dried material to produce calcination thereof, a gravity gas-separating device for receiving the hot gases discharged from said calcining chamber and for separating calcined material carried in suspension therein, and means for introducing the hot waste gas separated in the last mentioned separator into the drying chamber.

In testimony whereof I have hereunto subscribed my name this 1st day of Dec. 1928.

McKINLEY STOCKTON.